United States Patent Office 3,552,748
Patented Jan. 5, 1971

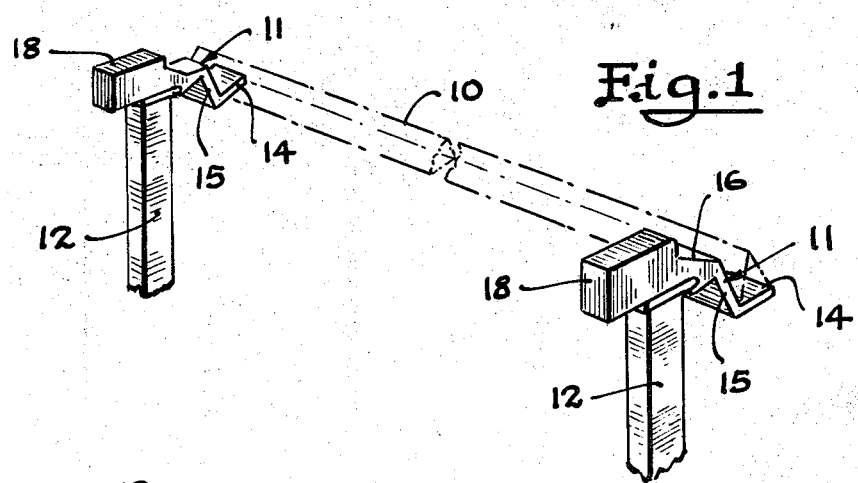
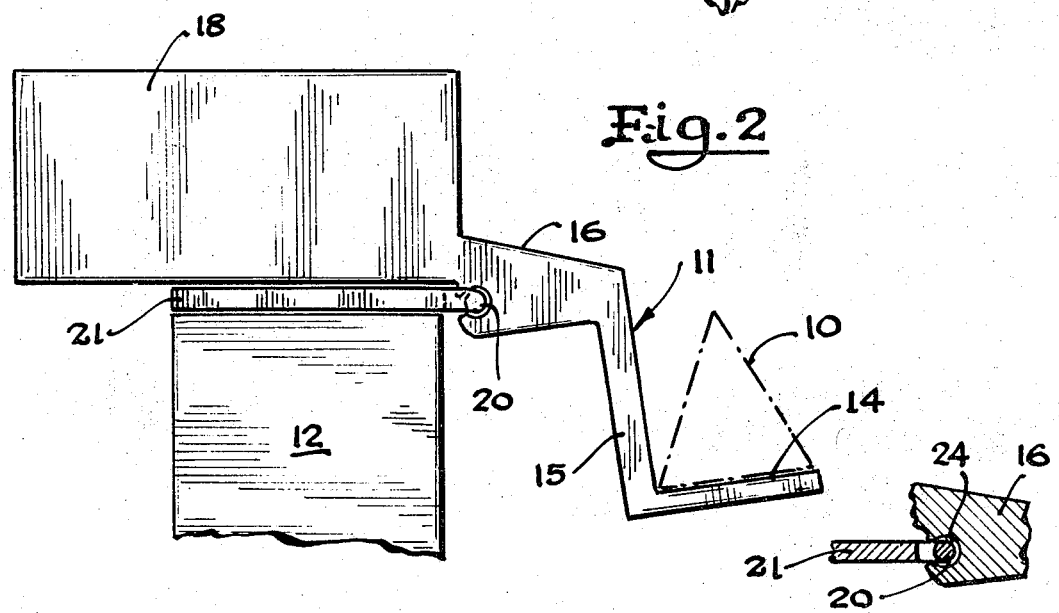
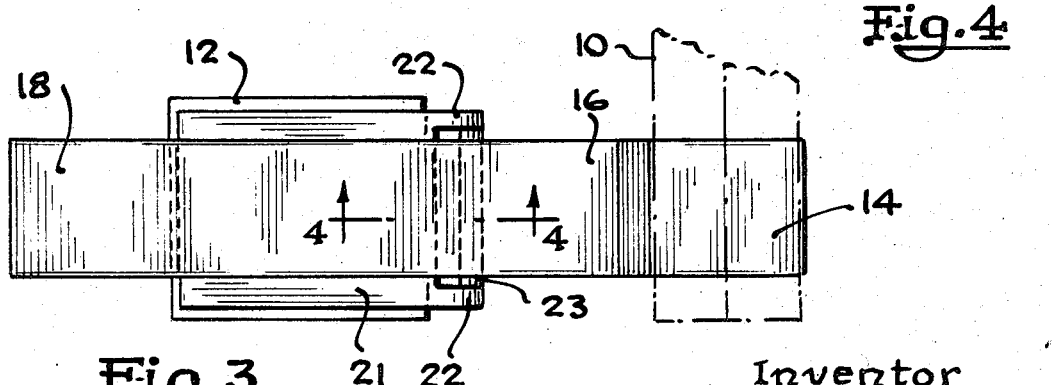
Inventor
Thomas Thomas
By Roy G. Story
Attorney

3,552,748
APPARATUS FOR HOLDING A POLE
VAULTING BAR
Thomas Thomas, 1110 Breezy Meadow Lane,
Spencer, Iowa 51301
Filed Dec. 30, 1968, Ser. No. 787,841
Int. Cl. A63b 5/06
U.S. Cl. 272—59
7 Claims

ABSTRACT OF THE DISCLOSURE

A cradle for holding a pole vault or high jump bar is yieldably connected by an arm which holds the cradle a sufficient distance from the standards to allow free movement of the cradle with respect to the standards. Pivoted counterweights, magnets, springs or flexible connecting arms return the cradle to the original position after it is tripped.

---

This invention relates to apparatus for pole vaulting and high jumping and has to do particularly with means for holding the horizontal bar on the vertical standards.

Conventional pole vault standards generally contain pegs projecting from one side to support the bar. The bar rests against the standards on the pegs and can move in only one horizontal direction which is outwards and in only one vertical direction which is upwards. Pole vaulters often strike the bar with their bodies, arms, legs and hands as they are descending and, as a consequence, impart to the bar a downward or backward blow. Unless such blow is sufficiently hard to cause the bar to rebound up from the pegs or out from the standards, the bar may not be released from the pegs. Obviously, the force required to dislodge the bar in such instances is greater than that necessary to release the bar if struck in the opposite direction. It will be observed, therefore, that the jumper who strikes the bar descending may well have an advantage over the jumper who strikes the bar in an upward direction which dislodges the bar with less difficulty.

The error in dislodging the bar is magnified if there happens to be substantial wind. The direction of the approach of the jumper on the runway is usually allowed to be with the wind to avoid the possibility of the wind influencing the jumper to fall backwards and to miss the landing area. As the pegs on the standards must face away from the runner and with the wind, there is a tendency for the wind to blow the bar from the pegs or, at least, to make it easier than normally for the bar to be dislodged by a slight blow from the vaulter. Sometimes, in a strong wind, it is necessary for attendants to hold the bar by hand up to the time of the jump thereby raising a question whether the bar was blown off the pegs by the wind or brushed off by the contestant.

An object of the present invention is to provide means for holding an obstacle bar to standards whereby pressure exerted from any angle on the bar will readily cause a uniform release of the bar.

Another object of the invention is to construct a device for holding the bar on the standards, said device being in a pivoted association with standards and the bar being located at a level below the pivot point.

A further object of the invention is to produce a yieldable cradle for the bar and to mount the cradle so that the bar is located horizontally to one side and away from the standards.

Other objects and advantages of the invention will be apparent from the following description to be read in connection with the accompanying drawing.

FIG. 1 is a perspective view of one embodiment of the invention in which the cradle is pivotally connected to the standard and balanced by a counterweight.

FIG. 2 is an enlarged end view of the apparatus shown in FIG. 1.

FIG. 3 is a top view of FIG. 2.

FIG. 4 is a sectional view along the line 4—4 of FIG. 3.

Figure 5:
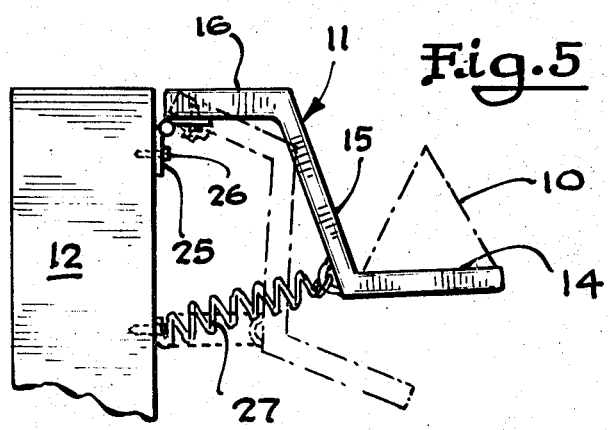
FIG. 5 is an end view of another embodiment of the invention in which the cradle is hinged to the standards and the tripping action controlled by a spring.

Referring to FIGS. 1–4 of the drawings, a bar 10 is supported by a tripping device indicated generally by the numeral 11, the tripping device being pivotally connected to the standards 12. The bar 10 may be any preferred or well known type used in pole vaulting or high jumping. It is preferably triangular in shape, as shown, but other shapes may be used such as square or rectangular.

The bar 10 rests in a cradle having a floor 14 and a back 15, the floor preferably being tilted upward slightly from the horizontal. The shape of the cradle provides a corner in which the bar rests. The shape of the cradle together with the upward inclination of the floor assures that the bar is in the same position for each contestant and also eliminates largely the hazard of the wind blowing the bar off the standard before or after or as the contestant jumps.

The cradle is connected by a horizontal arm 16 to a counterweight 18. The arm 16 is pivoted at 20 and the counterweight is adjusted so that it will properly balance the bar 10 and the cradle 11. The pivot 20 may be any suitable hinge or other bearing device to provide free movement of the cradle. As shown in FIGS. 2 and 3, one type of pivot comprises a plate 21 fastened by bolts or screws to the top of the standard 12 and a pair of ears 22 projecting from the plate and holding a bearing 23 which operates in a bearing housing 24 of the arm 16. The bearing 23 may be merely a hinge pin or any other conventional bearing, such as for example a roller bearing, which offers little resistance or friction to the free action of the pivot.

The standards 12 may be any type suitable for the purpose, either conventional or newly devised. Such standards are usually supported on a base, adjusted in height and calibrated. The calibrations are correlated with the top of the bar so as to indicate the height of the bar. If the device is installed on existing standards, the plate 21 should be of a thickness required to elevate the cradle floor to correspond with the top of the standards and to maintain the accuracy of the existing height calibrations. If the device and standard are manufactured as a unit, then the plate 21 would be unnecessary and the pivot 20 could be a part of the standard.

The arm 16 is of sufficient length to hold the cradle at a substantial outward or horizontal distance from the standard 12. Such position provides free movement of the cradle and the bar without any obstruction from the standard. For example, there should be the necessary clearance allowed by the arms for the cradle to move sufficiently and unhindered by the standard in any direction including toward the standard to permit the cradle to tip to a degree that the bar will slide therefrom. The cradle 11 is suspended by the vertical arm or back 15 at an elevation substantially below the point at which the arm 16 is pivoted. The foregoing features of construction of the cradle are important as they permit free, sensitive movement of the bar and cradle when struck in any direction toward the standard. It should be noted that once the counterweight is overbalanced that the cradle will then remain in tripped position until the bar is fully released because the counterweight is forced into a position of less efficiency due to the movement more directly over the pivot point. The counterweight remains sufficient, however, even though in a fully tripped position to bring the cradle back into bar placement position. Also, the tripping action of the cradle and the releasing of the bar are assured when struck in a more or less downward direction from any angle. The bar, of course, will be dislodged by any upward or other directional pressure which ordinarily cause release of the bar in any conventional high jump or pole vault apparatus.

Figure 6:
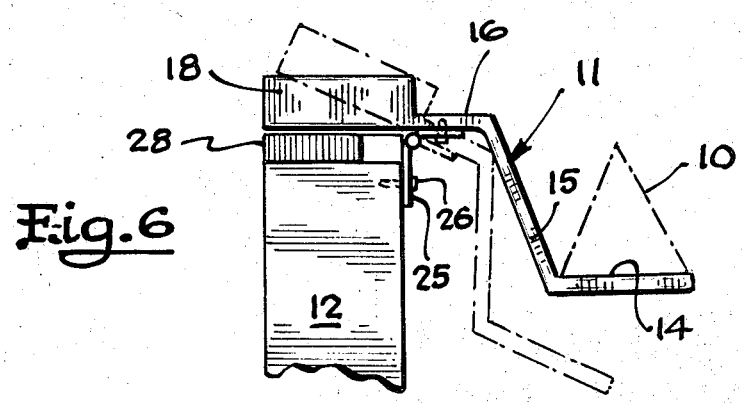
FIG. 6 is an end view of a further embodiment of the invention in which the tripping action of the cradle is controlled by a weight and magnet.
Figure 7:
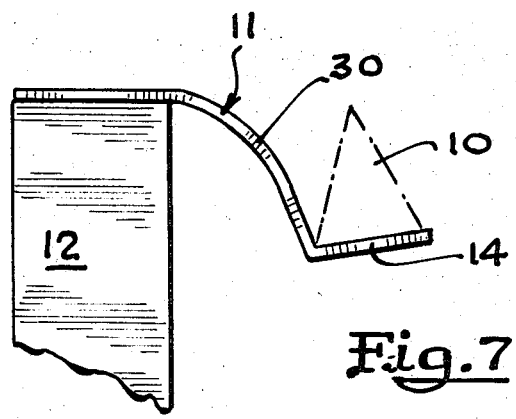
FIG. 7 is an end view of still another embodiment of the invention wherein the tripping action of the cradle is controlled by a flexible arm which connects the cradle to the standards.

In FIGS. 5–7 alternative means other than counterweights are shown for controlling the tripping action of the cradle. In these figures the same numerals as in FIGS. 1–4 are used to indicate the bar 10, cradle 11, standards 12, cradle floor 14, vertical arm or back 15 and horizontal arm 16.

Referring to FIG. 5, the cradle is attached to the standard 12 by a conventional hinge 25 secured with screws 26. In this embodiment the cradle is controlled by a spring 27. When the bar is struck the spring is compressed and the bar is dislodged from the cradle as a result of the tipping action of the cradle. Although the spring does not allow the cradle to remain in a tripped position until the bar is fully released as is the case with the apparatus of FIGS. 1–4, the rebounding action of the spring dislodges the bar quite efficiently.

In the embodiment of FIG. 6, the tripping action of the cradle is controlled by a weight 18 and a magnet 28. The magnet holds the weight down to over compensate for the weight of the bar 10 and, therefore, eliminates the need for large weights. The size of the magnet is selected to correspond to the tripping pressure desired, and then only enough weights are used to bring the cradle back into the bar receiving position. By correlating the sizes of the magnets and the weights considerable latitude is provided for selecting the desired sensitivity in the tripping action of the cradle.

The variation of the invention shown in FIG. 7 requires no hinge, pivot or weights as in the previous embodiments. It will be observed from the drawing that the floor 14 of the cradle is connected to the standard 12 by a flexible arm 30. The arm may be made of plastic, metal, rubber or any other suitable material which supply the proper strength to hold the bar in place undisturbed but, when subjected to pressure such as a jumper striking the bar in pole vaulting, the bar will be dislodged. Polystyrene, spring steel, nylon and vulcanized natural or synthetic rubbers may be used. The flexible arm 30 is curved so as to maintain the cradle in substantially the same position relative to the standard 12 as is obtained by means of the horizontal arm 16 and vertical arm or back 15 in FIGS. 1–6. This embodiment of the invention provides a very inexpensive and easily installed device. The flexible arm must be sufficiently resilient so that when the bar is struck the arm will rebound and dislodge the bar in a manner similar to that of the spring of FIG. 5.

The counterweight 18 may be advantageously provided with means (not shown) for adjustment to impart the desired sensitivity to the tripping action, as for instance, by using multiple weights or by providing for movement of the weights as on a bar to various distances from the pivot point.

The tripping device herein described has the advantage that it releases the bar from the full effect of the blow when struck by the jumper. The bar consequently will sustain less bending and breaking damage than results from conventional standards. As a result sturdier and more resilient bars can be used than heretofore without the risk of bending or breaking and injury to the jumper.

While the tripping device as shown in the drawings is attached to the top of the standard and the standard constructed so as to be adjustable in height from the base, it is to be understood that the standard may be more or less fixed in height and the tripping device adjustable to various elevations on the standard.

From the foregoing description it will be observed that the operation of the devices herein described is very simple. In FIGS. 1–4 the counterweight is set to hold the cradle and bar in position until struck by the jumper. The device is then tripped and the bar dislodged by the slight pressure from a blow by the jumper. When the bar is fully released the counterweight will bring the cradle back to the original position to receive the bar.

In FIGS. 5 and 7, the spring 27 or the flexible arm 30 are adjusted to hold the cradle and bar in a normal use position. The pressure exerted by a blow from the jumper on the bar will cause the spring or flexible arm to impart a rebounding action to the cradle whereby the bar will be dislodged. The cradle will then assume its normal position again to receive the bar.

The device of FIG. 6 is operated by adjusting the counterweight so that it is sufficient to return the cradle to a normal position after the bar has been dislodged. The magnet is adjusted so that it will have sufficient strength to hold the weight down when the bar is placed in the cradle but will permit the cradle to trip when the bar is struck by the jumper.

What is claimed is:

1. A device for holding a bar on a pole vault standard comprising in combination with an upright standard, a cradle for holding the bar and means connecting the cradle with the standard, said means containing portions extending outwardly and downwardly from the standard to hold the cradle a sufficient distance away from the standard to permit sufficient free action of the cradle in a vertical and horizontal direction in response to engagement of a bar by a pole vaulter to disengage the bar from the cradle, and said connecting means holding the cradle a substantial distance vertically below the point of attachment of the connecting means to the standard.

2. A device as defined in claim 1 in which the cradle contains floor and back portions, the floor portion being tilted upwardly to hold the bar.

3. A device as defined in claim 1 in which the connecting means includes a horizontal arm pivoted to the standard.

4. A device as defined in claim 1 in which the connecting means includes an arm and a counterweight, said means being attached to the standard by a pivoting means between the arm and the counterweight.

5. A device as defined in claim 1 in which the connecting means includes a horizontal arm hinged to the standard and a spring operating between the standard and the cradle to control the movement of the cradle.

6. A device as defined in claim 4 in which a magnet operates on the counterweight to increase the counter balancing effect of the weight.

7. A device as defined in claim 1 in which the connecting means is a flexible arm.

References Cited

UNITED STATES PATENTS 3,224,764  12/1965  Olsen _____ 272—59

RICHARD C. PINKHAM, Primary Examiner

R. W. DIAZ, Assistant Examiner